US012136415B2

(12) United States Patent
Audhkhasi et al.

(10) Patent No.: US 12,136,415 B2
(45) Date of Patent: Nov. 5, 2024

(54) MIXTURE MODEL ATTENTION FOR FLEXIBLE STREAMING AND NON-STREAMING AUTOMATIC SPEECH RECOGNITION

(71) Applicant: Google LLC, Mountain View, CA (US)

(72) Inventors: Kartik Audhkhasi, Mountain View, CA (US); Bhuvana Ramabhadran, Mt. Kisco, NY (US); Tongzhou Chen, Mountain View, CA (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 343 days.

(21) Appl. No.: 17/644,343

(22) Filed: Dec. 15, 2021

(65) Prior Publication Data
US 2022/0310073 A1 Sep. 29, 2022

Related U.S. Application Data

(60) Provisional application No. 63/166,347, filed on Mar. 26, 2021.

(51) Int. Cl.
G10L 15/16 (2006.01)
G06F 1/03 (2006.01)
(Continued)

(52) U.S. Cl.
CPC ............... G10L 15/16 (2013.01); G06F 1/03 (2013.01); G06N 3/04 (2013.01); G06N 3/0455 (2023.01); G10L 19/167 (2013.01)

(58) Field of Classification Search
CPC ............................. G10L 15/16; G06N 3/0455
See application file for complete search history.

(56) References Cited

U.S. PATENT DOCUMENTS

| 2022/0108689 A1* | 4/2022 | Tripathi | G06N 3/04 |
| 2022/0310073 A1* | 9/2022 | Audhkhasi | G06N 3/044 |
| 2022/0310074 A1* | 9/2022 | Audhkhasi | G10L 15/26 |

OTHER PUBLICATIONS

Gao et al.,"Universal ASR: Unifying streaming and non-streaming ASR using a single encoder-decoder model." arXiv preprint arXiv:2010.14099 (Year: 2020).*

(Continued)

Primary Examiner — Samuel G Neway
(74) Attorney, Agent, or Firm — Honigman LLP; Brett A. Krueger; Grant Griffith

(57) ABSTRACT

A method for an automated speech recognition (ASR) model for unifying streaming and non-streaming speech recognition including receiving a sequence of acoustic frames. The method includes generating, using an audio encoder of an automatic speech recognition (ASR) model, a higher order feature representation for a corresponding acoustic frame in the sequence of acoustic frames. The method further includes generating, using a joint encoder of the ASR model, a probability distribution over possible speech recognition hypothesis at the corresponding time step based on the higher order feature representation generated by the audio encoder at the corresponding time step. The audio encoder comprises a neural network that applies mixture model (MiMo) attention to compute an attention probability distribution function (PDF) using a set of mixture components of softmaxes over a context window.

18 Claims, 7 Drawing Sheets

(51) Int. Cl.
*G06N 3/04* (2023.01)
*G06N 3/0455* (2023.01)
*G10L 19/16* (2013.01)

(56) References Cited

OTHER PUBLICATIONS

Yeh et al., "Transformer-transducer: End-to-end speech recognition with self-attention." arXiv preprint arXiv:1910.12977 (Year: 2019).*
Tripathi et al., "Transformer transducer: One model unifying streaming and non-streaming speech recognition." arXiv preprint arXiv:2010.03192 (Year: 2020).*
Yang et al., "Breaking the softmax bottleneck: A high-rank RNN language model." arXiv preprint arXiv:1711.03953 (Year: 2017).*

\* cited by examiner

| Model | Inference | test-clean | test-other |
|---|---|---|---|
| Base (65, 0) | (65, 0) | 2.5 | 5.9 |
| Base (65, 64) | (65, 64) | 2.2 | 5.2 |
|  | (65, 0) | 4.4 | 11.1 |
| MiMo (65, 64) | (65, 64) | 2.3 | 5.2 |
|  | (65, 0) | 3.6 | 9.1 |
| + weight noise | (65, 64) | 2.4 | 5.7 |
|  | (65, 0) | 2.7 | 6.7 |

FIG. 4

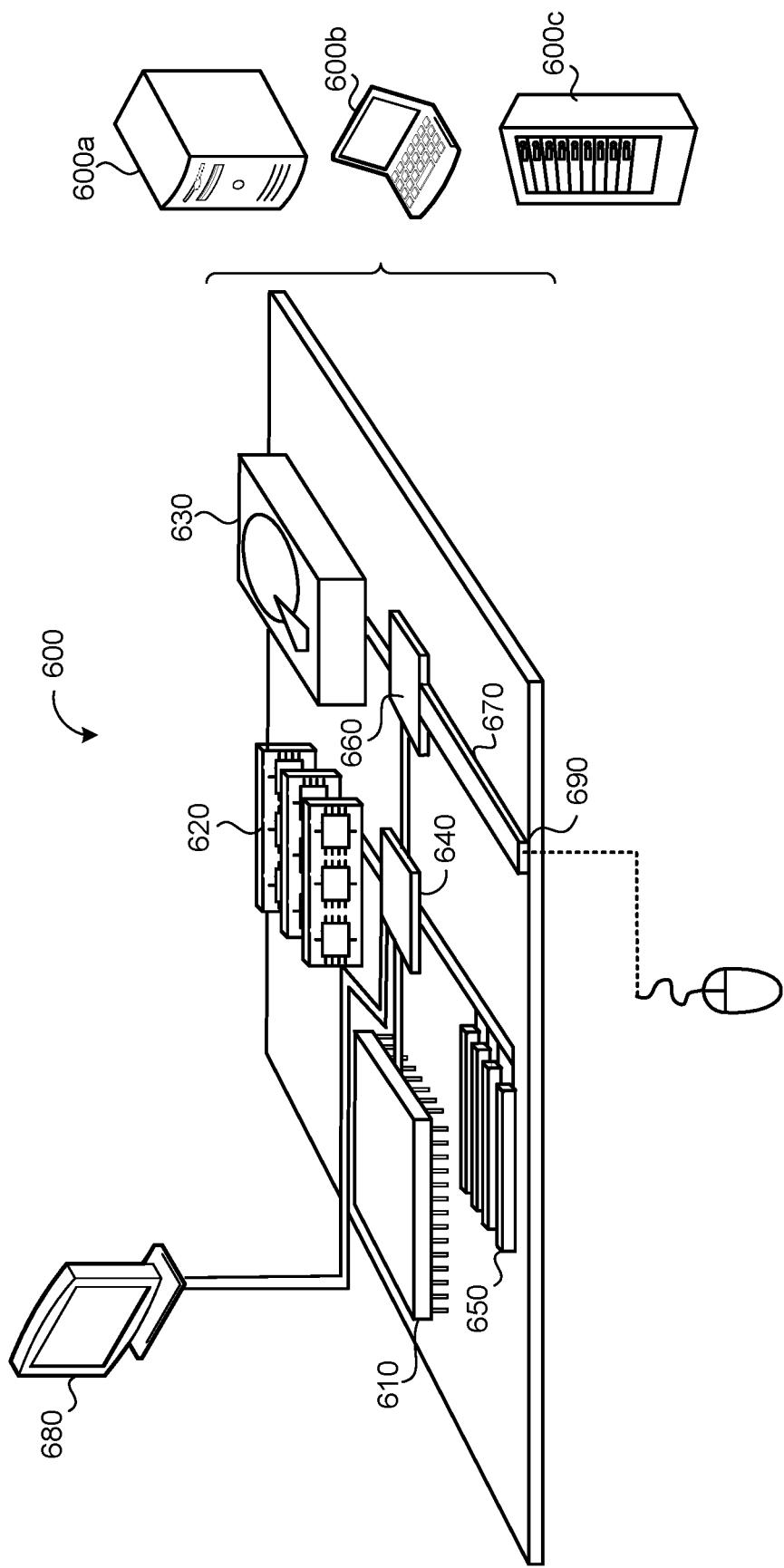

MIXTURE MODEL ATTENTION FOR FLEXIBLE STREAMING AND NON-STREAMING AUTOMATIC SPEECH RECOGNITION

CROSS REFERENCE TO RELATED APPLICATIONS

This U.S. patent application claims priority under 35 U.S.C. § 119(e) to U.S. Provisional Application 63/166,347, filed on Mar. 26, 2021. The disclosure of this prior application is considered part of the disclosure of this application and is hereby incorporated by reference in its entirety.

TECHNICAL FIELD

This disclosure relates to mixture model attention for flexible streaming and non-streaming automatic speech recognition.

BACKGROUND

Automatic speech recognition (ASR) systems have evolved from multiple models where each model had a dedicated purpose to integrated models where a single neural network is used to directly map an audio waveform (i.e., input sequence) to an output sentence (i.e., output sequence). This integration has resulted in a sequence-to-sequence approach, which generates a sequence of words (or graphemes) when given a sequence of audio features. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system. These E2E automatic speech recognition (ASR) systems have made tremendous progress, surpassing conventional ASR systems in several common benchmarks including word error rates (WER). The architecture of E2E ASR models are largely application dependent. For instance, a number of applications that involve user interaction, such as voice-search or on-device dictation, require the model to perform recognition in a streaming fashion. Other applications, like offline video captioning, do not require the model to be streaming and can make use of future context to improve performance.

SUMMARY

One aspect of the disclosure provides an automated speech recognition (ASR) model for unifying streaming and non-streaming speech recognition. The ASR model includes an audio encoder configured to receive, as input, a sequence of acoustic frames. The audio encoder is further configured to generate, at each of a plurality of time steps, a higher order feature representation for a corresponding acoustic frame in the sequence of acoustic frames. The ASR model further includes a joint network configured to receive, as input, the higher order feature representation generated by the audio encoder at each of the plurality of time steps. The joint network is further configured to generate, at each of the plurality of time steps, a probability distribution over possible speech recognition hypothesis at the corresponding time step. The audio encoder includes a neural network that applies mixture model (MiMo) attention to compute an attention probability distribution function (PDF) using a set of mixture components of softmaxes over a context window.

Implementations of the disclosure may include one or more of the following optional features. In some implementations, the set of mixture components of the MiMo attention are designed to cover all possible context use cases during inference. In other implementations, each mixture component of the set of mixture components includes a fully-normalized softmax.

Further, the ASR model may switch between streaming and non-streaming modes by adjusting mixture weights of the MiMo attention. In some implementations, the neural network of the audio encoder includes a plurality of conformer layers. In other implementations, the neural network of the audio encoder includes a plurality of transformer layers.

In some implementations, the ASR model includes a label encoder configured to receive, as input, a sequence of non-blank symbols output by a final softmax layer and generate, at each of the plurality of time steps, a dense representation. In these implementations, the joint network is further configured to receive, as input, the dense representation generated by the label encoder at each of the plurality of time steps. In these implementations, the label encoder may include a neural network of transformer layers, conformer layers, or long short-term memory (LSTM) layers.

Further, the label encoder may include a look-up table embedding model configured to look-up the dense representation at each of the plurality of time steps. In some examples, the possible speech recognition hypotheses generated at each of the plurality of time steps corresponds to a set of output labels each representing a grapheme or a word piece in a natural language.

Another aspect of the disclosure provides a computer-implemented method for an automated speech recognition (ASR) model for unifying streaming and non-streaming speech recognition. The computer-implemented method when executed on data processing hardware causes the data processing hardware to perform operations including receiving a sequence of acoustic frames. Further operations, performed at each of a plurality of time steps, include generating, using an audio encoder of the ASR model, a higher order feature representation for a corresponding acoustic frame in the sequence of acoustic frames. The operations further include generating, using a joint encoder of the ASR model, a probability distribution over possible speech recognition hypothesis at the corresponding time step based on the higher order feature representation generated by the audio encoder at the corresponding time step. The audio encoder includes a neural network that applies mixture model (MiMo) attention to compute an attention probability distribution function (PDF) using a set of mixture components of softmaxes over a context window.

This aspect may include one or more of the following optional features. In some implementations, the set of mixture components of the MiMo attention are designed to cover all possible context use cases during inference. In other implementations, each mixture component of the set of mixture components includes a fully-normalized softmax.

Further, the ASR model may switch between streaming and non-streaming modes by adjusting mixture weights of the MiMo attention. In some implementations, the neural network of the audio encoder includes a plurality of conformer layers. In other implementations, the neural network of the audio encoder includes a plurality of transformer layers.

In some implementations, the operations further include generating, at each of the plurality of time steps, using a label encoder of the ASR model configured to receive a sequence of non-blank symbols output by a final softmax layer of the ASR model, a dense representation. In these implementations, generating the probability distribution over possible speech recognition hypothesis at the corresponding time step is further based on the sequence of non-blank output symbols output by the final softmax layer at the corresponding time step. In these implementations, the label encoder may include a neural network of transformer layers, conformer layers, or long short-term memory (LSTM) layers.

Further, the label encoder may include a look-up table embedding model configured to look-up the dense representation at each of the plurality of time steps. In some examples, possible speech recognition hypotheses generated at each of the plurality of time steps corresponds to a set of output labels each representing a grapheme or a word piece in a natural language.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is an example table illustrating word error rates of baseline and Mixture Model streaming/non-streaming conformers.

FIG. 6 is a schematic view of an example computing device that may be used to implement the systems and methods described herein.

Like reference symbols in the various drawings indicate like elements.

DETAILED DESCRIPTION

Figure 1A:
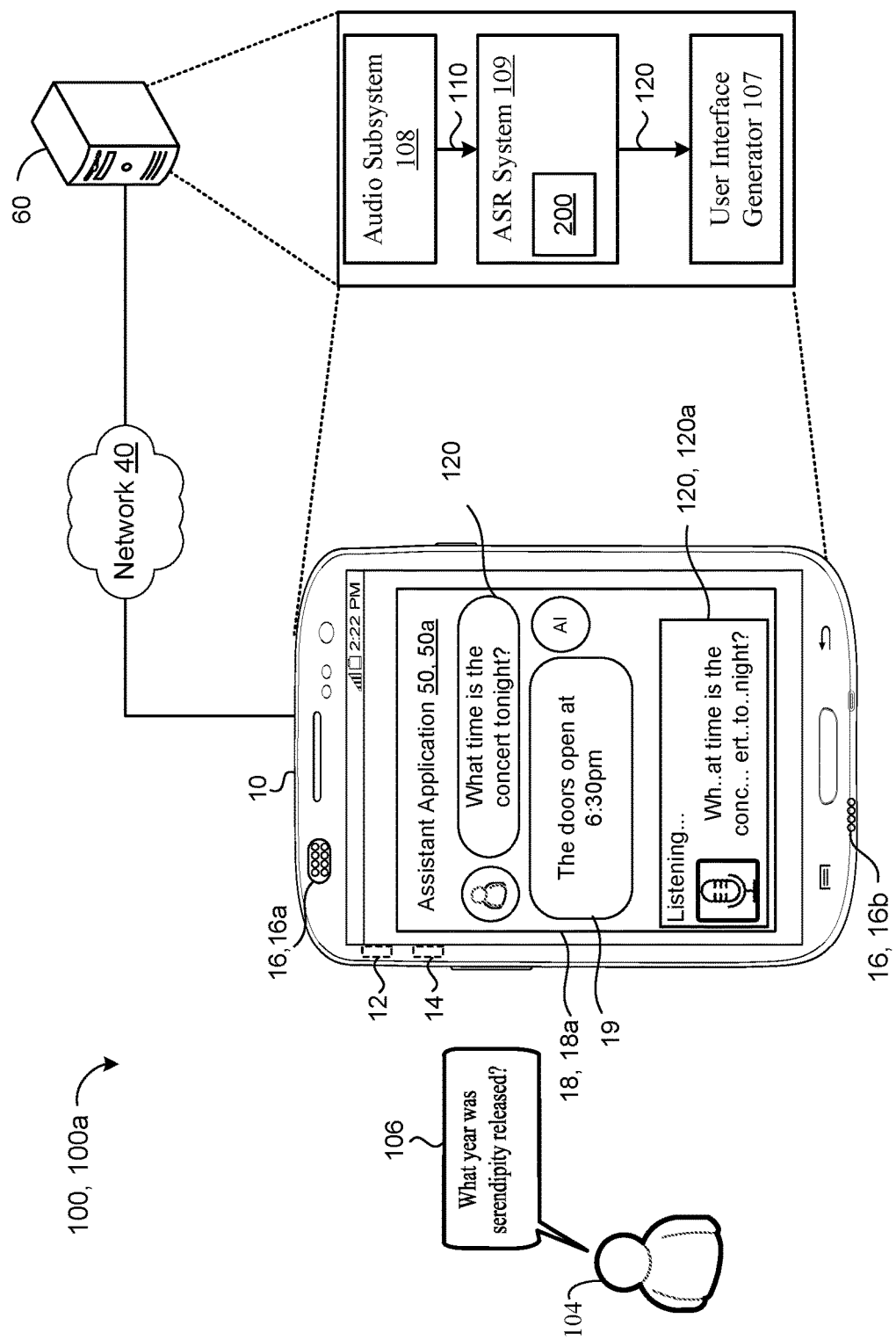
FIGS. 1A and 1B are schematic views of example speech environments using speech recognition model trained using mixture model attention to switch between streaming and non-streaming speech recognition modes.

Automated speech recognition (ASR) systems focus on providing not only quality/accuracy (e.g., low word error rates (WERs)), but also low latency (e.g., a short delay between the user speaking and a transcription appearing). Recently, end-to-end (E2E) ASR models have gained popularity in achieving state-of-the-art performance in accuracy and latency. In contrast to conventional hybrid ASR systems that include separate acoustic, pronunciation, and language models, E2E models apply a sequence-to-sequence approach to jointly learn acoustic and language modeling in a single neural network that is trained end to end from training data, e.g., utterance-transcription pairs. Here, an E2E model refers to a model whose architecture is constructed entirely of a neural network. A full neural network functions without external and/or manually designed components (e.g., finite state transducers, a lexicon, or text normalization modules). Additionally, when training E2E models, these models generally do not require bootstrapping from decision trees or time alignments from a separate system.

When using an ASR system today there may be a demand for the ASR system to decode utterances in a streaming fashion that corresponds to displaying a description of an utterance in real time, or even faster than real-time, as a user speaks. To illustrate, when an ASR system is displayed on a user computing device, e.g., such as a mobile phone, that experiences direct user interactivity, an application (e.g., a digital assistant application), executing on the user device and using the ASR system, may require the speech recognition to be streaming such that words, word pieces, and/or individual characters appear on the screen as soon as they are spoken. Additionally, it is also likely that the user of the user device has a low tolerance for latency. For instance, when the user speaks a query requesting the digital assistant to retrieve details from a calendar application for an upcoming appointment, the user would like the digital assistant to provide a response conveying the retrieved details as quickly as possible. Due to this low tolerance, the ASR system strives to run on the user device in a manner that minimizes an impact from latency and inaccuracy that may detrimentally affect the user's experience. However, attention-based sequence-to-sequence models such as listent-attend-spell (LAS) model that function by reviewing an entire input sequence of audio before generating output text, do not allow for streaming outputs as inputs are received. Due to this deficiency, deploying attention-based sequence-to-sequence models for speech applications that are latency sensitive and/or require real-time voice transcription may pose issues. This makes an LAS model alone not an ideal model for latency-sensitive applications and/or applications providing streaming transcription capabilities in real-time as a user speaks.

Another form of a sequence-to-sequence model known as a recurrent neural network transducer (RNN-T) does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and be able to run offline (i.e., without a network connection); therefore, avoiding unreliability issues with communication networks.

Due to their inability to apply look ahead audio context (e.g., right context) when predicting recognition results, RNN-T models still lag behind large state-of-the-art conventional models (e.g., a server-based model with separate AM, PM, and LMs)) and attention-based sequence-to-sequence models (e.g., LAS model) in terms of quality (e.g., speech recognition accuracy as often measured by word error rate (WER)). Recently, transformer-transducer (T-T) and conformer-transducer (C-T) models have gain popularity over RNN-T models due to their ability to process an entire audio sequence for computing attention probability density functions at each time step. As such, T-T and C-T models can be used for either streaming or non-streaming speech recognition due to their ability to use look-ahead context. However, two models are trained separately for performing respective ones of streaming and non-streaming speech recognition. For instance, a user will employ a streaming speech recognition model, such as the RNN-T, C-T, or T-T model, for recognizing conversational queries and a separate non-streaming speech recognition model for recognizing non-conversation queries. Typically, the application the user is directing his/her speech toward can be used to identify which one of the streaming or non-streaming speech recognition model to use for speech recognition. Requiring different and separate speech recognition models for performing speech recognition depending on the application and/or query type is computationally expensive and requires sufficient memory capacity for storing the respective models on the user device. Even if one of the models is executable on a remote server, additional costs for connecting to the remote server and bandwidth constraints can impact speech recognition performance, and ultimately, user experience.

Implementations herein are directed toward unifying streaming and non-streaming acoustic encoders by training the speech recognition model (e.g., T-T or C-T model) using mixture model attention to permit the trained speech recognition model to switch between streaming and non-streaming speech recognition modes during inference. A fundamental limitation of transformer- and conformer-based acoustic encoders lies in the computation of an attention probability density function (PDF) at each time step. Specifically, using a single softmax over an entire context window constrains the model to use the same context window size both during training and inference. The proposed Mixture Model (MiMo) attention provides a flexible alternative that alleviates the requirement to constrain context window size during inference to the same context window size used during training. As will become apparent, MiMo attention computes the attention PDF using a mixture model of softmaxes over the context window. The support of the mixture components is designed to cover all possible use cases during inference, e.g. full/whole-sequence context, limited left+right context, and left-only context. Since each mixture component is a fully-normalized softmax, any subset of mixture components can be applied during inference without incurring any mismatch. Thus, C-T and T-T models trained with MiMO attention can be used in various streaming and non-streaming modes at inference depending on the application at hand. Notably, MiMo attention does not add any additional complexity, parameters, or training loss to the model.

Figure 1B:
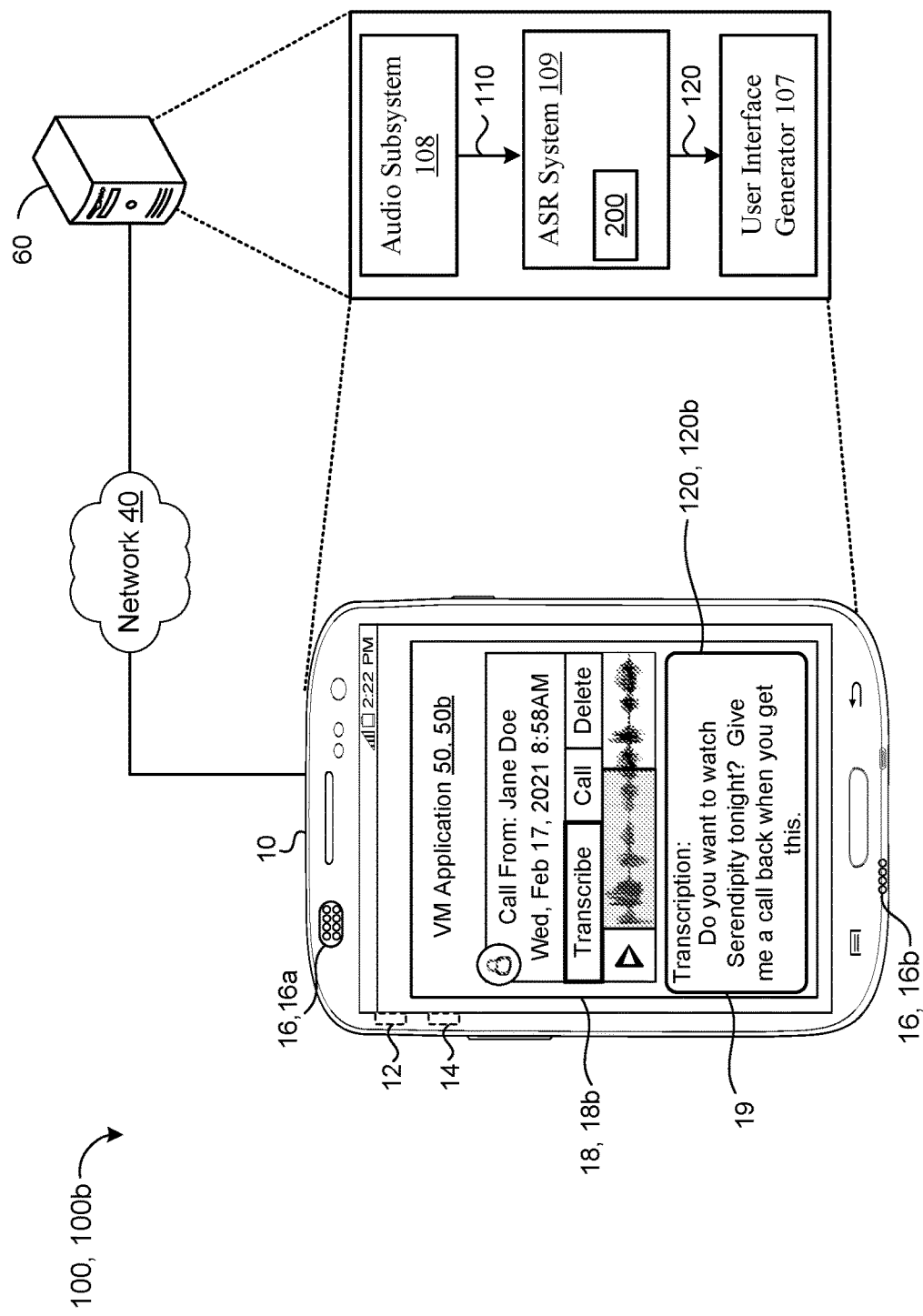

FIGS. 1A and 1B are examples of a speech environment 100, 100a—b. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 109 implementing an ASR model 200 trained with mixture model (MiMo) attention resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16a, and to convert the utterance 106 into a corresponding digital format associated with input acoustic frames 110 capable of being processed by the ASR system 109. In the example shown in FIG. 1A, the user 104 speaks a respective utterance 106 and the audio subsystem 108 converts the utterance 106 into corresponding audio data (e.g., acoustic frames) 110 for input to the ASR system 109. Thereafter, the model 200 receives, as input, the audio data 110 corresponding to the utterance 106, and generates/predicts, as output, a corresponding transcription 120 (also referred to as a recognition result/hypothesis 120) of the utterance 106.

The model 200 includes an acoustic encoder 300 trained with MiMo attention that computes an attention PDF at each time step using a mixture model of softmaxes over a context window. The support of the mixture components is designed to cover all possible use cases during inference, e.g. full/whole-sequence context, limited left+right context, and left-only context. Since each mixture component is a fully-normalized softmax, any subset of mixture components can be applied during inference without incurring any mismatch.

The model 200 also includes a decoder 220, 230 which enables the model 200 to be a single model that can operate in streaming and non-streaming mode (e.g., in contrast with two separate models where each model is dedicated to either a streaming mode or non-streaming mode). For instance, as shown in FIG. 1A, a digital assistant application 50 executing on the user device 10 may require the speech recognition to be streaming such that words, word pieces, and/or individual characters appear on the screen as soon as they are spoken. Additionally, it is also likely that the user 104 of the user device 10 has a low tolerance for latency when issuing queries for the digital assistant application 50 to perform. In these scenarios where the application demands minimal latency, the model 200 operates in a streaming mode where the model 200 may provide streaming transcription capabilities in real-time as the user 104 is speaking the utterance 106.

The user device 10 and/or the remote computing device 60 also executes a user interface generator 107 configured to present a representation of the transcription 120 of the utterance 106 to the user 104 of the user device 10. As described in greater detail below, the user interface generator 107 may display a speech recognition results 120a in a streaming fashion which is subsequently displayed as the final speech recognition result 120. In some configurations, the transcription 120 output from the ASR system 109 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example of FIG. 1A, the user 104 in the speech environment 100a interacts with a program or application 50 (e.g., the digital assistant application 50a) of the user device 10 that uses the ASR system 109. For instance, FIG. 1A depicts the user 104 communicating with the digital assistant application 50a and the digital assistant application 50a displaying a digital assistant interface 18 on a screen of the user device 10 to depict a conversation between the user 10 and a digital assistant of the digital assistant application 50a. In this example, the user 104 asks the digital assistant application 50a, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 109.

Continuing with the example, the model 200, while receiving the acoustic frames 110 corresponding to the utterance 106 as the user 104 speaks, encodes the acoustic frames 110 using the audio encoder 300 (i.e., FIG. 2) and then decodes an encoded representation of the acoustic frames 110 using the decoder 220, 230 (FIG. 2) into the streaming speech recognition results 120a. The user interface generator 107 presents, via the digital assistant interface 18, a representation of the streaming speech recognition results 120a of the utterance 106 to the user 104 of the user device 10 in a streaming fashion such that words, word pieces, and/or individual characters appear on the screen as soon as they are spoken. The user interface generator 107 also presents, via the digital assistant interface 18, a representation of the final speech recognition result 120 of the utterance 106 to the user 104 of the user device 10.

In the example shown in FIG. 1A, the digital assistant application 50a may respond to the question posed by the user 104 using natural language processing. Natural language processing generally refers to a process of interpreting written language (e.g., the partial speech recognition results 120a and/or the final speech recognition result 120b) and determining whether the written language prompts any action. In this example, the digital assistant application 50a uses natural language processing to recognize that the question from the user 10 regards the user's environment and more particularly a song playing in the user's vicinity. By recognizing these details with natural language processing, the automated assistant returns a response 19 to the user's query where the response 19 states, "The doors open at 6:30 pm." In some configurations, natural language processing occurs on the remote computing device 60 in communication with the data processing hardware 12 of the user device 10.

FIG. 1B is another example of speech recognition with the ASR system 109 of the speech environment 100b. As shown in the example, the user 104 interacts with a voicemail application 50, 50b displaying a voicemail application interface 18, 18b on the screen of the user device 10 to transcribe a voicemail that was left for the user 104 by Jane Doe. In this example, latency is not important, however accuracy of the transcription when processing long-tail proper nouns or rare words is important. The model 200 of the ASR system 109 is able to take advantage of the full context of the audio by waiting until all of the acoustic frames 110 corresponding to the voicemail are generated. This voicemail scenario also illustrates how the model 200 is capable of handling a long-form of speech because a voicemail is often multiple sentences or even several paragraphs. The ability to handle long-form speech is particularly advantageous over other ASR models, such as two-pass models with LAS decoders, because these two pass-models often suffer from long-form issues (e.g., a higher word deletion rate on long-form speech) when applied to long-form conditions.

With continued reference to FIG. 1B, as discussed with respect to FIG. 1A, the model 200 encodes the acoustic frames 110 using the audio encoder 300 receiving the acoustic frames 110. By contrast to the example of FIG. 1A where the audio encoder 300 operates in a streaming mode using only left context, the audio encoder 300 is switched to operate in a non-streaming mode using both left and right context. Here, the mixture weights of the audio encoder 300 trained with MiMo attention may be set to appropriate values associated with the non-streaming mode. After the model 200 receives all of the acoustic frames 110 and encodes them with the audio encoder 300, the model 200 provides the audio encoder output as input to the decoder 220, 230 to generate the final speech recognition result 120b.

Figure 2:
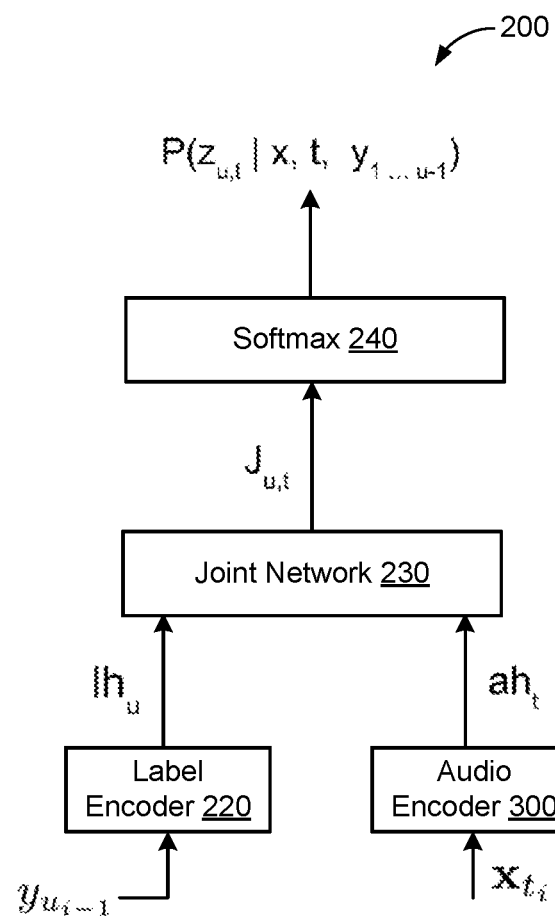
FIG. 2 is a schematic view of an example speech recognition model having a transducer model architecture.

With reference to FIG. 2, the model 200 may provide an end-to-end (E2E) speech recognition by integrating acoustic, pronunciation, and language models into a single neural network, and does not require a lexicon or a separate text normalization component. Various structures and optimization mechanisms can provide increased accuracy and reduced model training time. The model 200 may include a Transformer-Transducer (T-T) or Conformer-Transducer (C-T) model architecture, which adheres to latency constraints associated with interactive applications. An example T-T model is described in U.S. application Ser. No. 17/210,465, filed on Mar. 23, 2021, the contents of which are incorporated by reference in their entirety. An example C-T model is described in "*Conformer: Convolution-augmented Transformer for Speech Recognition*," arxiv.org/pdf/2005.08100, the contents of which are incorporated by reference in their entirety. The model 200 provides a small computational footprint and utilizes less memory requirements than conventional ASR architectures, making the model architecture suitable for performing speech recognition entirely on the user device 10 (e.g., no communication with a remote server 60 is required). The model 200 includes the audio encoder 300, a label encoder (e.g., prediction network) 220, and a joint network 230. The label encoder 220 and joint network 230 collectively form the decoder.

The audio encoder 300, which is roughly analogous to an acoustic model (AM) in a traditional ASR system, includes a neural network having a plurality of conformer layers or transformer layers. For instance, the audio encoder 300 reads a sequence of d-dimensional feature vectors (e.g., acoustic frames 110 (FIG. 1)) x=($x_1,x_2, \ldots, x_T$), where $x_t \in \mathbb{R}_d$, and produces at each time step a higher-order feature representation. This higher-order feature representation is denoted as $ah_1, \ldots, ah_T$.

Similarly, the label encoder 220 may also include a neural network of transformer layers, conformer layers, long-term short-term (LSTM) memory layers, or a look-up table embedding model, which, like a language model (LM), processes the sequence of non-blank symbols output by a final Softmax layer 240 so far, $y_0, \ldots, y_{ui-1}$, into a dense representation $lh_u$ that encodes predicted label history.

Finally, with the T-T or C-T model architecture, the representations produced by the audio and label encoders 300, 220 are combined by the joint network 230 using a dense layer $J_{u,t}$. The joint network 230 then predicts $P(z_{u,t}|x, t, y_1, \ldots, y_{u-1})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $z_{u,t}$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the model 200 at the corresponding output step. In this manner, the model 200 does not make a conditional independence assumption, rather the prediction of each symbol is conditioned not only on the acoustics but also on the sequence of labels output so far.

Implementations herein are directed toward replacing a multi-headed attention mechanism in the transformer or conformer layers of the audio encoder 300 with the MiMo attention to afford greater flexibility of switching between streaming an non-streaming modes during inference. The MiMo attention is used to compute an output a sequence ($y_0, \ldots, y_{T-1}$) of feature vectors from an input sequence ($x_0, \ldots, x_{T-1}$) of feature vectors by generating a PDF over the plurality of T time steps. Un-normalized attention scores ($s_0^k, \ldots, s_{T-1}^k$) are denoted for the plurality of T time steps for generating $y_k$ at the current time step. The formulation does not assume how these scores were generated. For example, these could have been computed by taking the dot product between a query vector for time step k with all the T key vectors. While conventional attention would convert the attention scores to PDF over the T time steps using a single softmax, the MiMo attention instead applies a mixture of M softmaxes to compute the attention PDF as follows.

$$(p_0^k, \ldots, p_{T-1}^K) = \Sigma_{m=0}^{M-1} w_m \text{softmax}_m (s_0^k, \ldots, s_{T-1}^k) \quad (1)$$

where $w_0, \ldots, w_{M-1}$ are mixture weights. Advantageously, the mixture model permits that the support of the softmax mixture components can be decided/set during training to cater to all possible context use-cases during inference. This flexibility is not available in standard/conventional attention.

Figure 3:
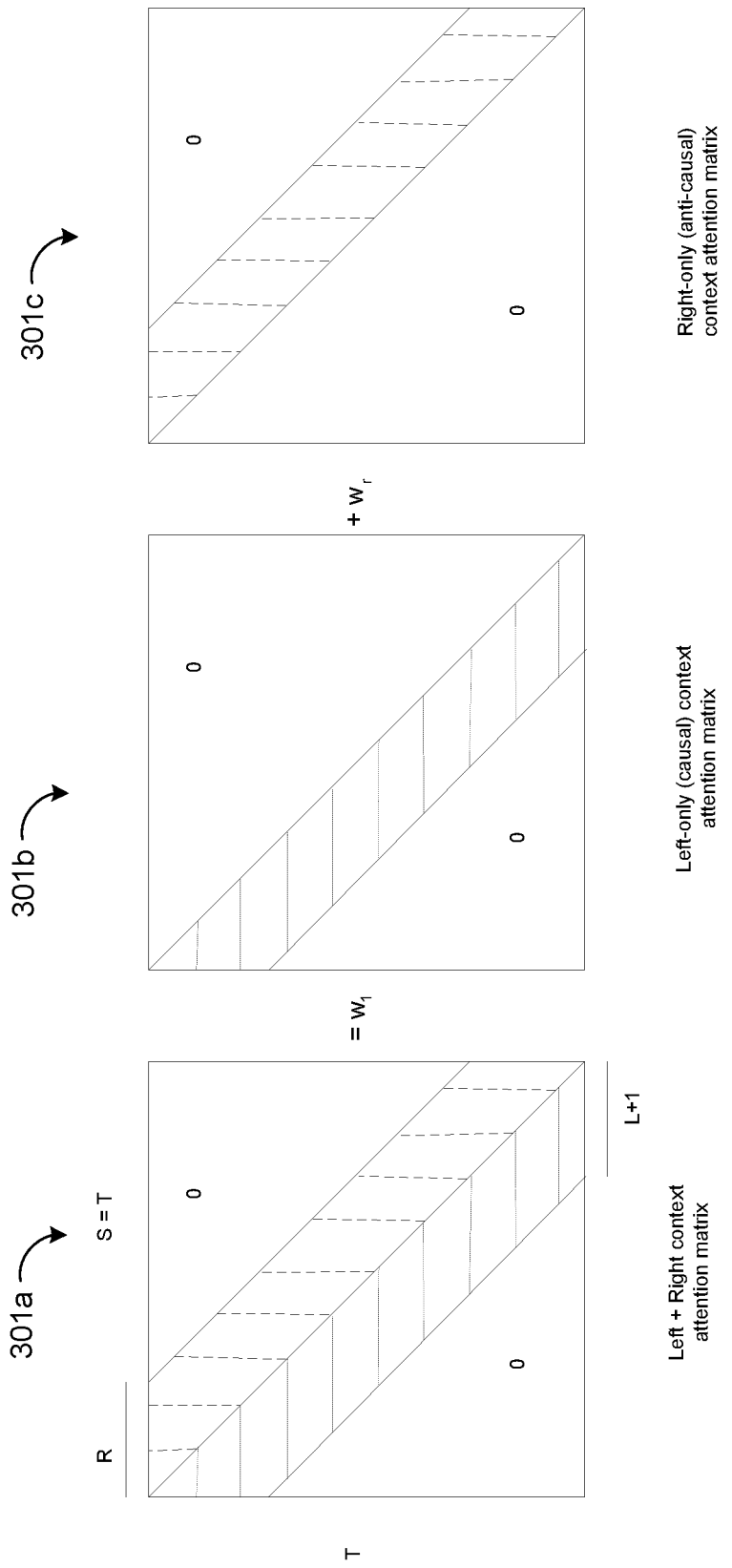
FIGS. 3A-3C illustrates example attention probability matrices.

In a non-limiting example where the the M softmaxes is set to two mixture components including a first component spanning over k−L, k time steps and a second component spanning over [k+1, k+R]. In other words, the first softmax oper-ates over the left+center context of L+1 time steps whereas the second softmax operates over the right context of R time steps relative to the center frame at time step k. The schematic view 301 of FIGS. 3A-3C illustrates attention probability matrices 301a, 301b, 301c of size T×T with MiMo attention for the simple case of M=2 mixture components. The T×T attention probability matrix 301a of FIG. 3A is written as a mixture model composed of left-only (casual, denoted by horizontal dashed lines) and right-only (anti-casual, denoted by vertical dashed lines) attention matrices. MiMo attention splits this band diagonal matrix into a weighted sum of a lower-band diagonal matrix for the left+center context and an upper-band diagonal matrix for the right context. All the matrices are row-stochastic (i.e., each row sums to 1) and hence represent properly-normalized attention PDFs.

During inference, one can use both left+right context (non-streaming mode), only left context (streaming mode) by setting the mixture weights $w_0$=1, or only right context by setting $w_1$=1. It is easy to see that MiMo attention is a general framework that can accommodate all types of contexts and use-cases during inference.

Training an ASR model with MiMo attention does not change the training loss or add any additional complexity. In practice, it may be useful to add noise to the mixture weights during training. For the M=2 case described above, u~uniform(0,$w_1$) may be sampled per training batch and for use in perturbing the mixture weights as $w_0$+u and $w_1$−u.

FIG. 4 shows a table 400 of WERs on test-clean and test-other for an example data set. The table 400 illustrates WERs of baseline and MiMo streaming/non-streaming conformers on Librispeech-960. In table 400, (L,R) denotes the size of the left+center and right context. All checkpoints are picked based on the dev-clean WER. Two baseline ASR models are trained—a left-context only model with context size of 65, and a non-streaming model with left context of 65 and right context of 64. The base-line non-streaming (65, 64) model gives a lower WER than the corresponding streaming (65, 0) model when using the matched non-streaming (65, 64) inference graph.

The model 200 may be trained on a remote server. The trained model 200 may be pushed to a user device for performing on-device speech recognition.

Figure 5:
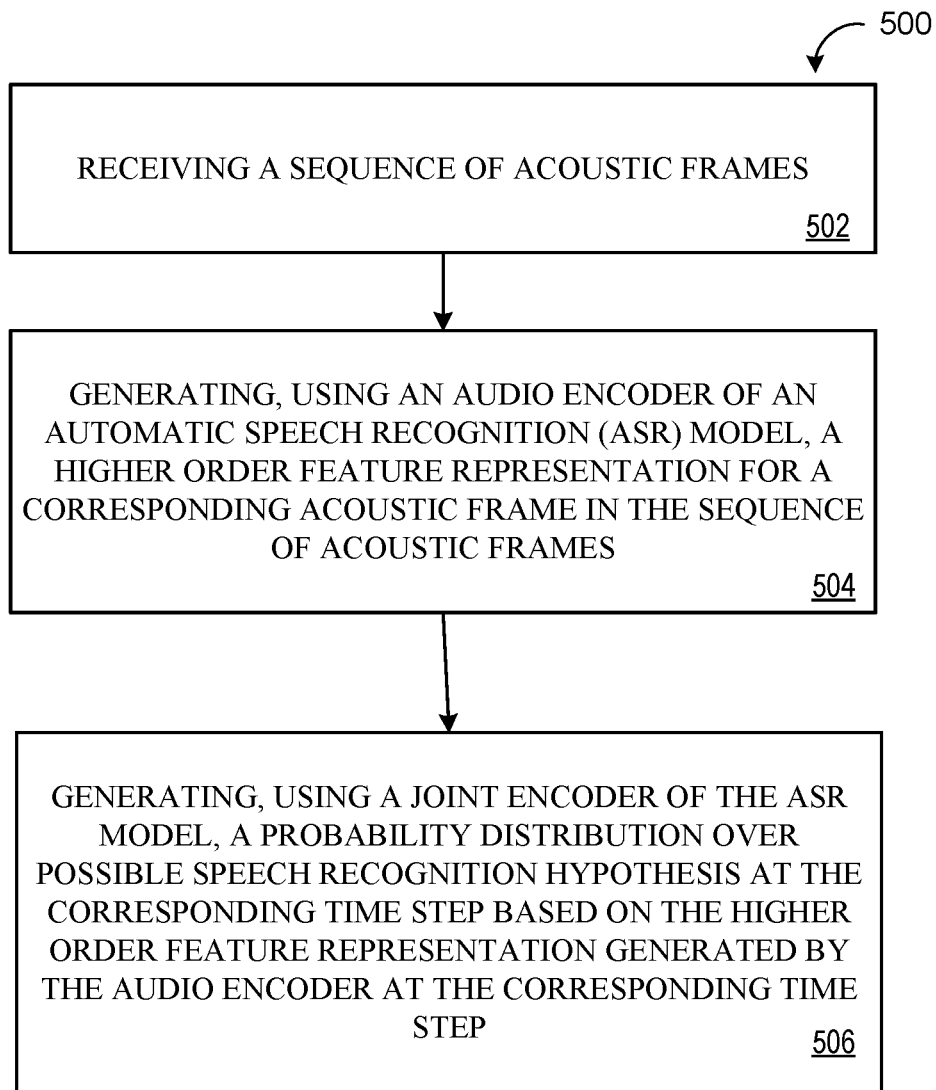
FIG. 5 is a flowchart of an example arrangement of operations for a method of unifying streaming and non-streaming speech recognition.

FIG. 5 is a flowchart of an example arrangement of operations for a method 500 of unifying streaming and non-streaming speech recognition. The data processing hardware 12 (FIG. 1A) may execute instructions stored on the memory hardware 14 (FIG. 1A) to perform the example arrangement of operations for the method 500. At operation 502, the method 500 includes receiving a sequence of acoustic frames 110. The method 500 may then continue to operations 504 and 506, performed at each of a plurality of time steps.

At operation 504, the method 500 includes generating, using an audio encoder 300 of an automatic speech recognition (ASR) model 200, a higher order feature representation for a corresponding acoustic frame 110 in the sequence of acoustic frames 110. At operation 506, the method 500 includes generating, using a joint encoder of the ASR model, a probability distribution over possible speech recognition hypothesis at the corresponding time step based on the higher order feature representation generated by the audio encoder 300 at the corresponding time step. Here, the audio encoder 300 includes a neural network that applies mixture model (MiMo) attention to compute an attention probability distribution function (PDF) using a set of mixture components of softmaxes over a context window.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. Data processing hardware executing instructions stored on memory hardware that causes the data processing hardware to execute an automated speech recognition (ASR) model for unifying streaming and non-streaming speech recognition, the ASR model comprising:
   an audio encoder configured to:
      receive, as input, a sequence of acoustic frames; and
      generate, at each of a plurality of time steps, a higher order feature representation for a corresponding acoustic frame in the sequence of acoustic frames; and
   a joint network configured to:
      receive, as input, the higher order feature representation generated by the audio encoder at each of the plurality of time steps; and
      generate, at each of the plurality of time steps, a probability distribution over possible speech recognition hypothesis at the corresponding time step,
   wherein the audio encoder comprises a neural network that applies mixture model (MiMo) attention to compute an attention probability distribution function (PDF) using a set of mixture components of softmaxes over a context window spanning from a left+center context to a right context, the set of mixture components of softmaxes comprising:
      a first mixture component that operates over the left+ center context; and
      a second mixture component that operates over the right context,
   wherein the ASR model switches between streaming and non-streaming modes by adjusting mixture weights of the MiMO attention.

2. The data processing hardware of claim 1, wherein the set of mixture components of the MiMo attention are designed to cover all possible context use cases during inference.

3. The data processing hardware of claim 1, wherein each mixture component of the set of mixture components comprises a fully-normalized softmax.

4. The data processing hardware of claim 1, wherein the neural network of the audio encoder comprises a plurality of conformer layers.

5. The data processing hardware of claim 1, wherein the neural network of the audio encoder comprises a plurality of transformer layers.

6. The data processing hardware of claim 1, further comprising a label encoder configured to:
   receive, as input, a sequence of non-blank symbols output by a final softmax layer; and generate, at each of the plurality of time steps, a dense representation,
wherein the joint network is further configured to receive, as input, the dense representation generated by the label encoder at each of the plurality of time steps.

7. The data processing hardware of claim 6, wherein the label encoder comprises a neural network of transformer layers, conformer layers, or long short-term memory (LSTM) layers.

8. The data processing hardware of claim 6, wherein the label encoder comprises a look-up table embedding model configured to look-up the dense representation at each of the plurality of time steps.

9. The data processing hardware of claim 1, wherein possible speech recognition hypotheses generated at each of the plurality of time steps corresponds to a set of output labels each representing a grapheme or a word piece in a natural language.

10. A computer-implemented method that when executed on data processing hardware causes the data processing hardware to perform operations comprising:
receiving a sequence of acoustic frames;
at each of a plurality of time steps:
generating, using an audio encoder of an automatic speech recognition (ASR) model, a higher order feature representation for a corresponding acoustic frame in the sequence of acoustic frames; and
generating, using a joint encoder of the ASR model, a probability distribution over possible speech recognition hypothesis at the corresponding time step based on the higher order feature representation generated by the audio encoder at the corresponding time step,
wherein the audio encoder comprises a neural network that applies mixture model (MiMo) attention to compute an attention probability distribution function (PDF) using a set of mixture components of softmaxes over a context window spanning from a left+center context to a right context, the set of mixture components of softmaxes comprising:
a first mixture component that operates over the left+center context; and
a second mixture component that operates over the right context,
wherein the ASR model switches between streaming and non-streaming modes by adjusting mixture weights of the MiMO attention.

11. The computer-implemented method of claim 10, wherein the set of mixture components of the MiMo attention are designed to cover all possible context use cases during inference.

12. The computer-implemented method of claim 10, wherein each mixture component of the set of mixture components comprises a fully-normalized softmax.

13. The computer-implemented method of claim 10, wherein the neural network of the audio encoder comprises a plurality of conformer layers.

14. The computer-implemented method of claim 10, wherein the neural network of the audio encoder comprises a plurality of transformer layers.

15. The computer-implemented method of claim 10, wherein the operations further comprise:
generating, at each of the plurality of time steps, using a label encoder of the ASR model configured to receive a sequence of non-blank symbols output by a final softmax layer of the ASR model, a dense representation,
wherein generating the probability distribution over possible speech recognition hypothesis at the corresponding time step is further based on the sequence of non-blank output symbols output by the final softmax layer at the corresponding time step.

16. The computer-implemented method of claim 15, wherein the label encoder comprises a neural network of transformer layers, conformer layers, or long short-term memory (LSTM) layers.

17. The computer-implemented method of claim 15, wherein the label encoder comprises a look-up table embedding model configured to look-up the dense representation at each of the plurality of time steps.

18. The computer-implemented method of claim 15, wherein possible speech recognition hypotheses generated at each of the plurality of time steps corresponds to a set of output labels each representing a grapheme or a word piece in a natural language.

* * * * *